Jan. 29, 1929.

V. L. RONCI 1,700,451

ELECTRON DISCHARGE DEVICE

Filed July 7, 1925

Inventor:
Victor L. Ronci
by E. W. Adams Att'y.

Patented Jan. 29, 1929.

1,700,451

UNITED STATES PATENT OFFICE.

VICTOR L. RONCI, OF BROOKLYN, NEW YORK, ASSIGNOR TO WESTERN ELECTRIC COMPANY, INCORPORATED, OF NEW YORK, N. Y., A CORPORATION OF NEW YORK.

ELECTRON-DISCHARGE DEVICE.

Application filed July 7, 1925. Serial No. 41,936.

This invention relates to electron discharge devices and more particularly to such devices capable of handling high voltages.

An object of this invention is an electrode supporting structure in which vibration of the electrodes is substantially prevented.

The invention contemplates a supporting structure in which metallic supporting rods are provided with undercut portions which are embraced by longitudinal tubular extensions on a collar. The opposed faces of the extensions are welded together to securely clamp the rods in the tubular portions. This arrangement provides a rigid structure comprising few parts which may easily be assembled by machine, thereby considerably increasing production. Furthermore, the rods are tightly held against movement by the clamping bands, thereby preventing vibration of the electrode structure.

Figure 1:
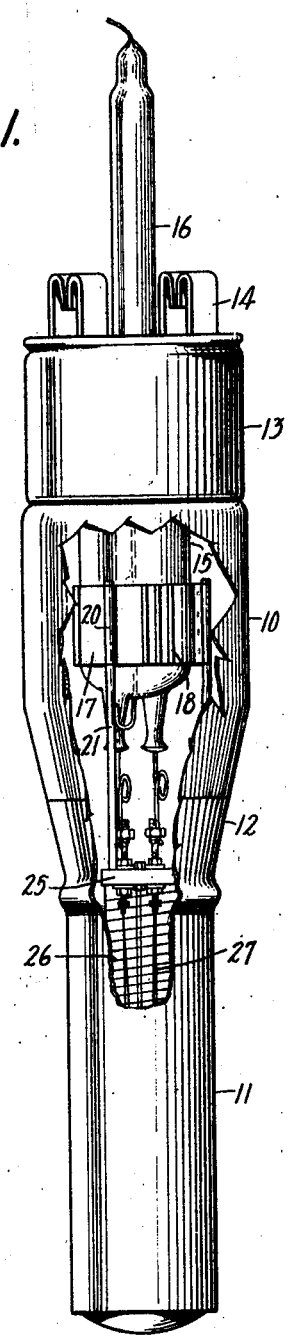
Figure 2:
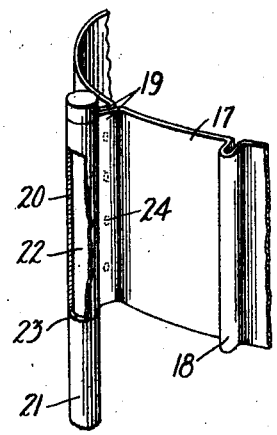
Figure 3:
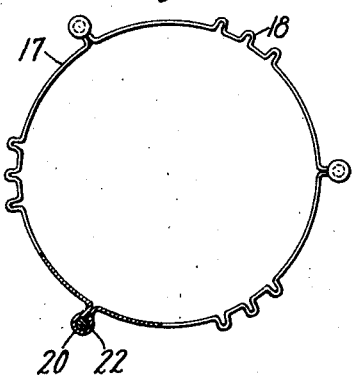

Referring to the drawings, Fig. 1 shows an electron discharge device with a part broken away to illustrate clearly the invention;

Fig. 2 is a partial view in perspective of the collar and the supporting rod, and Fig. 3 is a plan view of the collar.

The enclosing vessel of the discharge device comprising a glass portion 10 and a cup-shaped metal portion 11, joined together at 12, in the manner disclosed in W. G. Housekeeper Patent 1,294,466, Feb. 18, 1919. A cylindrical base 13 is cemented to the glass portion and carries contacts 14 to provide external connections for the filament. A glass stem 15 is joined to the glass portion 10 and projects within the enclosing vessel. A central tubular glass member 16 is joined to the stem and projects outwardly with respect thereto and passes through an opening in the base 13.

Surrounding the glass stem 15 is a metal band or collar 17 which is frictionally held on the stem by means of corrugations 18. Intermediate each group of corrugations on the collar are right-angular parallel extensions 19 which are joined together at their outer ends by a longitudinal loop portion 20. Supported in each loop portion is a metallic rod 21 having an undercut portion 22 approximately the same length as the loop portion 20 on the collar. The undercutting of the rods provides shoulders 23 at each end of the undercut portion, which abut against the edge of the loop portion 20. The parallel right-angular extensions from the collar are fastened together in any desirable manner, for instance, by spot welding 24, thereby clamping the loop portion 20 securely around the undercut portion of the rod and spacing the rods from the glass stem. This arrangement provides a rigid connection between the collar and the supporting rods and prevents the chance of any loose connections, such as may happen if threaded rods and nuts were used. Furthermore, a considerable saving in assembly is accomplished by this invention since the number of parts are reduced and the operations can be performed by machinery.

The supporting rods 21 extending from the collar form a tripod support which carries a circular block 25 on which the grid 26 and filament 27 are supported.

Although a particular arrangement has been disclosed with respect to this invention, it is apparent that various modifications may be made in the details thereof without departing from the scope of the invention as defined in the appended claim.

What is claimed is:

In an electron discharge device, a glass stem, a collar surrounding said stem, said collar having corrugated portions for clamping the collar to the stem and integral tubular portions intermediate said corrugated portions, and a cylindrical supporting member in said tubular portions, said member having larger diameter ends abutting on the edges of said tubular portions.

In witness whereof, I hereunto subscribe my name this 3rd day of July A. D., 1925.

VICTOR L. RONCI.